US011593408B2

(12) United States Patent
Komninos et al.

(10) Patent No.: US 11,593,408 B2
(45) Date of Patent: Feb. 28, 2023

(54) IDENTIFYING DATA RELATIONSHIPS FROM A SPREADSHEET

(71) Applicants: INTERNATIONAL BUSINESS MACHINES CORPORATION, Armonk, NY (US); University of York, York (GB)

(72) Inventors: Alexandros Komninos, York (GB); Jonathan Co, York (GB); Andrew Thomas Nelmes, East Sheen (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/797,019

(22) Filed: Feb. 21, 2020

(65) Prior Publication Data

US 2021/0149926 A1  May 20, 2021

(30) Foreign Application Priority Data

Nov. 19, 2019 (GB) ..................................... 1916801

(51) Int. Cl.
*G06F 16/28* (2019.01)
*G06F 16/22* (2019.01)
(52) U.S. Cl.
CPC ........ *G06F 16/288* (2019.01); *G06F 16/2282* (2019.01); *G06F 16/283* (2019.01)
(58) Field of Classification Search
CPC ... G06F 16/288; G06F 16/2282; G06F 16/283
USPC ...................................................... 707/600
See application file for complete search history.

(56) References Cited

U.S. PATENT DOCUMENTS

| | | | |
|---|---|---|---|
| 5,259,766 A | 11/1993 | Sack | |
| 5,604,854 A | 2/1997 | Glassey | |
| 5,842,180 A | 11/1998 | Khanna | |
| 5,987,481 A | 11/1999 | Michelman | |
| 6,029,002 A | 2/2000 | Afifi | |
| 6,768,986 B2* | 7/2004 | Cras ...................... | G06F 16/283 709/224 |
| 6,775,675 B1 | 8/2004 | Nwabueze | |
| 6,804,682 B1 | 10/2004 | Kemper | |
| 6,829,621 B2 | 12/2004 | Keller | |
| 6,948,154 B1* | 9/2005 | Rothermel ............. | G06F 40/18 717/133 |

(Continued)

FOREIGN PATENT DOCUMENTS

EP  1622045 B1  2/2006

OTHER PUBLICATIONS

Ahmad et al., "A Type System for Statically Detecting Spreadsheet Errors," Proceedings of the 18th IEEE International Conference on Automated Software Engineering (ASE'03), 2003, IEEE, pp. 1-10.

(Continued)

*Primary Examiner* — Sheree N Brown
(74) *Attorney, Agent, or Firm* — Anthony Curro

(57) ABSTRACT

Proposed are concepts for identifying data relationships from a spreadsheet. Such a concept may transform formulae by replacing the variables in each formula with descriptive labels. This may, for example, expressing the transformed formulae in terms that have more meaning to a user, the facilitating understanding and/or analysis that would otherwise not be possible with the existing tools.

8 Claims, 9 Drawing Sheets

(56) References Cited

U.S. PATENT DOCUMENTS

| | | | |
|---|---|---|---|
| 7,082,569 B2* | 7/2006 | Voshell | H04L 12/2801 |
| | | | 715/219 |
| 7,181,440 B2* | 2/2007 | Cras | G06F 16/2428 |
| | | | 709/224 |
| 7,530,012 B2 | 5/2009 | Medicke | |
| 7,664,777 B2* | 2/2010 | Cras | G06F 16/2428 |
| | | | 709/227 |
| 7,716,167 B2 | 5/2010 | Colossi | |
| 7,747,939 B2* | 6/2010 | Thanu | G06F 40/18 |
| | | | 715/214 |
| 7,792,847 B2* | 9/2010 | Dickerman | G06F 16/283 |
| | | | 707/957 |
| 7,774,302 B2 | 10/2010 | Arras | |
| 7,809,712 B2* | 10/2010 | Witkowski | G06F 16/24 |
| | | | 707/765 |
| 8,239,750 B2* | 8/2012 | Thomsen | G06F 40/18 |
| | | | 715/212 |
| 8,990,675 B2 | 3/2015 | Folting | |
| 9,069,748 B2* | 6/2015 | Folting | G06F 16/283 |
| 9,104,659 B2 | 8/2015 | Treadwell | |
| 9,158,832 B1* | 10/2015 | Hiatt | G06F 40/14 |
| 9,367,423 B1 | 6/2016 | Ovadia | |
| 9,483,537 B1* | 11/2016 | Peters | G06F 16/254 |
| 9,652,516 B1* | 5/2017 | Peters | G06F 16/2456 |
| 9,886,518 B1 | 2/2018 | Xu | |
| 10,083,016 B1 | 9/2018 | Norman | |
| 10,769,361 B2* | 9/2020 | Hiatt | G06F 16/2246 |
| 10,789,182 B2 | 9/2020 | Bell | |
| 10,885,051 B1* | 1/2021 | Peters | G06F 16/254 |
| 11,093,703 B2* | 8/2021 | Viégas | G06F 40/177 |
| 2002/0087516 A1* | 7/2002 | Cras | G06F 16/2428 |
| 2002/0091707 A1* | 7/2002 | Keller | G06F 16/30 |
| 2002/0169799 A1* | 11/2002 | Voshell | H03M 7/30 |
| | | | 715/212 |
| 2003/0009649 A1* | 1/2003 | Martin | G06F 40/18 |
| | | | 712/1 |
| 2004/0205524 A1 | 10/2004 | Richter | |
| 2004/0221855 A1 | 11/2004 | Ashton | |
| 2004/0237029 A1* | 11/2004 | Medicke | G06F 16/283 |
| | | | 715/255 |
| 2005/0015360 A1* | 1/2005 | Cras | G06F 16/283 |
| 2006/0015805 A1 | 1/2006 | Humenansky | |
| 2006/0026012 A1 | 2/2006 | Campbell | |
| 2007/0014385 A1 | 1/2007 | Shiraishi | |
| 2007/0061344 A1 | 3/2007 | Dickerman | |
| 2007/0083875 A1 | 4/2007 | Jennings | |
| 2007/0162840 A1 | 7/2007 | Rochelle | |
| 2007/0220063 A1 | 9/2007 | O'Farrell | |
| 2007/0271227 A1 | 11/2007 | Momen-Pour | |
| 2008/0069448 A1 | 3/2008 | Turner | |
| 2008/0208720 A1 | 8/2008 | Dong | |
| 2008/0294612 A1* | 11/2008 | Wiles | G06F 16/242 |
| 2009/0077617 A1 | 3/2009 | Levow | |
| 2009/0210430 A1 | 8/2009 | Averbuch | |
| 2010/0169758 A1 | 7/2010 | Thomsen | |
| 2010/0274744 A1 | 10/2010 | Brdiczka | |
| 2011/0030057 A1 | 2/2011 | Chen | |
| 2011/0131546 A1 | 6/2011 | Elaasar | |
| 2011/0310112 A1* | 12/2011 | Zolotovitski | G06T 11/206 |
| | | | 345/589 |
| 2012/0011094 A1 | 1/2012 | Yamagaki | |
| 2012/0042242 A1* | 2/2012 | Garland | G06F 40/111 |
| | | | 715/256 |
| 2012/0079463 A1 | 3/2012 | Freeman | |
| 2012/0143831 A1 | 6/2012 | Amulu | |
| 2012/0151457 A1 | 6/2012 | Gennard | |
| 2012/0185425 A1 | 7/2012 | Reeves | |
| 2012/0254830 A1 | 10/2012 | Conrad | |
| 2012/0260045 A1 | 10/2012 | Adams | |
| 2013/0086459 A1* | 4/2013 | Folting | G06F 16/248 |
| | | | 715/212 |
| 2013/0132381 A1 | 5/2013 | Chakrabarti | |
| 2014/0250053 A1* | 9/2014 | Averbuch | G06F 16/283 |
| | | | 707/600 |
| 2014/0372993 A1 | 12/2014 | Hoban | |
| 2015/0095312 A1 | 4/2015 | Gulwani | |
| 2015/0186504 A1* | 7/2015 | Gorman | G06F 40/30 |
| | | | 707/752 |
| 2016/0004684 A1 | 1/2016 | Cudak | |
| 2017/0037238 A1 | 2/2017 | Kushihara | |
| 2017/0075973 A1 | 3/2017 | Miranker | |
| 2017/0091293 A1 | 3/2017 | Cummings | |
| 2017/0228357 A1 | 8/2017 | Hirzel | |
| 2017/0228358 A1 | 8/2017 | Hirzel | |
| 2017/0300467 A1 | 10/2017 | Campbell | |
| 2017/0315979 A1* | 11/2017 | Boucher | G06F 40/197 |
| 2018/0088753 A1* | 3/2018 | Viégas | G06F 40/216 |
| 2018/0150531 A1 | 5/2018 | Demonsant | |
| 2018/0196868 A1 | 7/2018 | Riggs | |
| 2018/0203838 A1* | 7/2018 | Hiatt | G06F 16/2246 |
| 2018/0276417 A1 | 9/2018 | Cerezo Sanchez | |
| 2018/0285347 A1 | 10/2018 | Mizobuchi | |
| 2018/0293219 A1* | 10/2018 | Hiatt | G06F 40/18 |
| 2019/0087400 A1 | 3/2019 | Chavoustie | |
| 2019/0188253 A1* | 6/2019 | Hiatt | G06F 16/285 |
| 2019/0278853 A1 | 9/2019 | Chen | |
| 2019/0361868 A1 | 11/2019 | Rogynskyy | |
| 2020/0402541 A1 | 12/2020 | Talbot | |
| 2021/0049421 A1 | 2/2021 | Tandecki | |
| 2021/0209297 A1* | 7/2021 | Dong | G06F 40/18 |

OTHER PUBLICATIONS

Aivaloglou et al., "Parsing Excel formulas: A grammar and its application on four large datasets," Journal of Software: Evolution and Process, 0000; 00:1-24, Published online in Wiley InterScience (www.interscience.wiley.com), DOI:10.1002/smr.

Barowy et al., ExceLint: Automatically Finding Spreadsheet Formula Errors, Proc. ACM Program Lang. vol. 2 No. OOPSLA, Article 148, Publication date: Nov. 2018., pp. 148-148.26.

Chambers et al., "Dimension Inference in Spreadsheets," 2008 IEEE Symposium on Visual Languages and Human-Centric Computing (VL/HCC), pp. 123-130.

Cunha, "Explaining spreadsheets with spreadsheets (Short Paper)," GPCE '18, Nov. 5-6, 2018, Boston, MA, USA, pp. 161-167.

Erwig, "Typed Table Transformations," Oregon State University, arXiv:1809.02746v1 [cs.SE] Sep. 8, 2018, https://arxiv.org/pdf/1809.02746.pdf, pp. 1-5.

Kankuzi, "Dynamic Translation of Spreadsheet Formulas to Problem Domain Narratives," PPIG 2017—28th Annual Conference, 2017, http://www.ppig.org/library/paper/dynamic-translation-spreadsheet-formulas-problem-domain-narratives, pp. 1-10.

Koch et al., "On the refinement of spreadsheet smells by means of structure information," Preprint Submitted to JSS, Special Issue on Program Debugging, Oct. 11, 2018, https://arxiv.org/abs/1810.04542, pp. 1-48.

Koci et al., "A Machine Learning Approach for Layout Inference in Spreadsheets," In Proceedings of the 8th International Joint Conference on Knowledge Discovery, Knowledge Engineering and Knowledge Management (IC3K 2016)—vol. 1: KDIR, pp. 77-88.

Koci et al., "XLIndy: Interactive Recognition and Information Extraction in Spreadsheets," DocEng '19: Proceedings of the ACM Symposium on Document Engineering 2019, Sep. 2019, Article No. 25, pp. 1-4.

Li et al., "WARDER: Refining Cell Clustering for Effective Spreadsheet Defect Detection via Validity Properties," 2019 IEEE 19th International Conference on Software Quality, Reliability and Security (QRS), pp. 139-150.

IBM, List of IBM Patents or Patent Applications Treated as Related, Appendix P, dated May 7, 2021, 2 pages.

Pending U.S. Appl. No. 16/797,007, filed Feb. 21, 2020, entitled "Identifying Content and Structure of OLAP Dimensions From a Spreadsheet,", 41 pages.

Pending U.S. Appl. No. 16/797,024, filed Feb. 21, 2020, entitled, "Generating an OLAP Model From a Spreadsheet,", 51 pages.

Pending U.S. Appl. No. 16/797,040, filed Feb. 21, 2020, entitled "Detecting Errors in Spreadsheets,", 47 pages.

(56) References Cited

OTHER PUBLICATIONS

Joshi, Vaidehi, "Leveling Up One's Parsing Game with ASTs", Dec. 4, 2017, Medium.com, pp. 1-19.
Aivaloglou, et al., "Parsing Excel formulas: A grammar and Its Application on Four Large Datasets," Journal of Software: Evolution and Process, Sep. 2017, 29(4):e1895, 25 pgs., DOI: 10.1002/smr.1895, <https://www.researchgate.net/publication/319609929_Parsing_Excel_formulas_A_grammar_and_its_application_on_4_large_datasets_AIVALOGLOU_et_al>.

\* cited by examiner

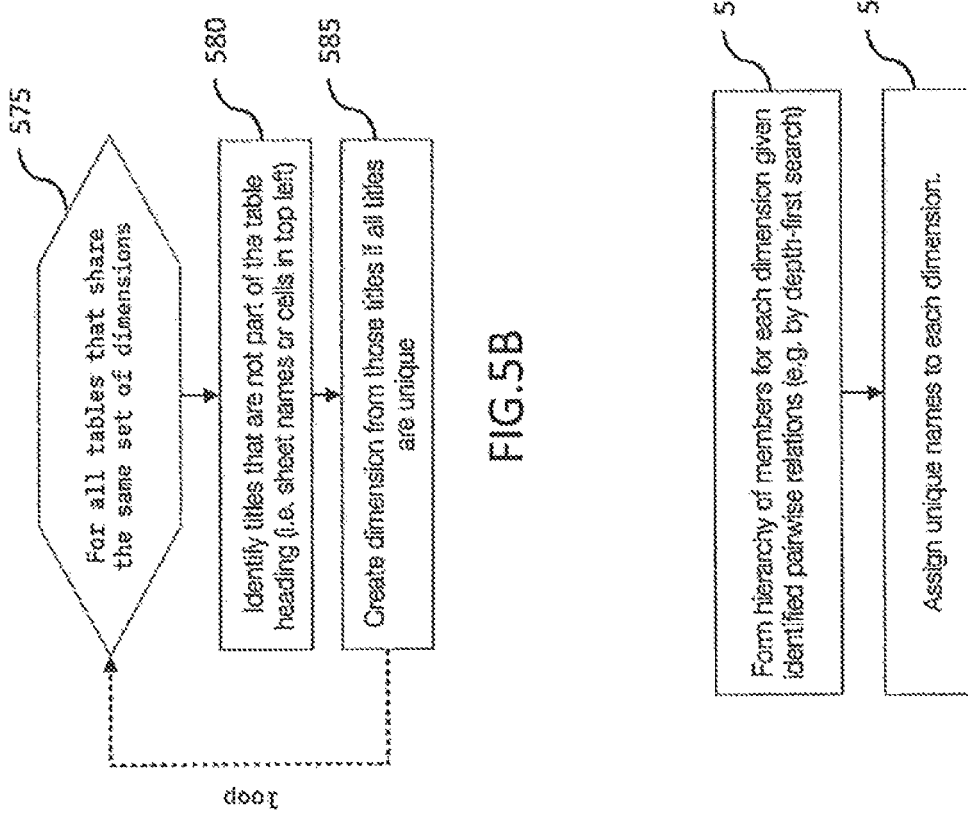

IDENTIFYING DATA RELATIONSHIPS FROM A SPREADSHEET

BACKGROUND

The present invention relates to processing and/or analyzing spreadsheets, and more particularly, to identifying data relationships from a spreadsheet. The present invention further relates to a computer program product comprising computer-readable program code that enables a processor of a processing system to implement such a method. The present invention further relates to a system for identifying data relationships from a spreadsheet.

Spreadsheets are a way of storing and representing data in a semi-structured way. The data is arranged in cells which are arranged in rows and columns. Data may be text, numeric or represent a date or time. The data displayed may be directly input or calculated. There is no distinction in a spreadsheet between data (for example, a number of sales from a given store) and metadata (for example, the name of the store). A spreadsheet may therefore be thought of as being a semi-structured cell-based data representation.

SUMMARY

The present invention seeks to provide a system for identifying data relationships from a spreadsheet comprising a plurality of formulae that may allow a user to analyze a spreadsheet and understand what is being represented.

The present invention also seeks to provide a method for identifying data relationships from a spreadsheet comprising a plurality of formulae. Such a method may be computer-implemented. The present invention further seeks to provide a computer program product including computer program code for implementing the proposed concepts when executed on a processor.

According to an embodiment of the present invention there is provided a method for identifying data relationships from a spreadsheet comprising a plurality of formulae. The method comprises grouping semantically equivalent formulae of the spreadsheet to define a first group of semantically equivalent formulae. The method then also comprise transforming each formula of the first group by replacing the variables in each formula with descriptive labels.

Proposed is a concept of identifying data relationships from a spreadsheet for analysis. Such a concept may transform formulae by replacing the variables in each formula with descriptive labels. This may, for example, express the transformed formulae in terms that have more meaning to a user, thereby facilitating understanding and/or analysis that would otherwise not be possible with the existing tools.

By way of example, proposed embodiments may be adapted to derive data relationships (such as business rules or technical inter-relationships) from formulae within spreadsheets that are not multidimensional.

In particular, the inventors propose that semantically equivalent formulae of a spreadsheet may be grouped together, and then formulae of the group may be transformed by replacing variables with descriptive labels. In this way, embodiments may be used to aid understanding of a spreadsheet and/or highlight errors, outliers or inconsistencies.

For example, transforming each formula may comprise: identifying one or more tables comprising numerical data from the spreadsheet; determining labels from the extracted one or more tables; grouping the determined labels into OLAP dimensions; and replacing cell references of each formula with corresponding members of the OLAP dimensions.

For instance, identifying one or more tables may comprise: identifying tabular structures within the spreadsheet; and classifying each the identified tabular structures as one of a column-based table and a crosstab type. Thus, not only may embodiments identify tables, proposed embodiments may also classify identified tables so as to assist in determining OLAP dimensions.

Grouping the determined labels into OLAP dimensions may comprise: for each of the one or more tables: identifying relationships between columns or rows of the table; and merging columns or rows of the table based on the identified relationships.

In an embodiment, replacing cell references of each formula may comprise: identifying a cell reference in a formula; and replacing the identified cell reference with an OLAP dimension of the corresponding table.

By way of example, replacing cell references of each formula may further comprise: removing an OLAP dimension of a formula if the formula is present in all member assignments of the OLAP dimension.

For instance, determining a set of OLAP dimensions may then comprise at least one of:

For a table classified as a column-based table: identifying relationships between columns or rows of the table; and merging columns or rows of the table based on the identified relationships; and For a table classified as a crosstab type: identifying title cells of the table; expanding the identified title cells to align labels with corresponding data in columns or rows; identifying relationships between the aligned columns or rows; and merging columns or rows based on the identified relationships; and identifying titles that are not part of a heading of a table, and defining a dimension from the identified titles.

It will therefore be appreciated that proposed embodiments may enable automatic transformation of formulae within a spreadsheet so as to facilitate easier understanding and/or identification of data relationships. For instance, the input to an embodiment may comprise an arbitrary spreadsheet, and the output provided automatically in response to the input may comprise a set of transformed formulae and/or inferred data relationships (e.g. technical feature interrelationships).

Embodiments may be employed in combination with conventional/existing spreadsheet analysis systems. In this way, embodiments may integrate into legacy systems so as to improve and/or extend their functionality and capabilities. An improved spreadsheet analysis system may therefore be provided by proposed embodiments.

According to another embodiment of the present invention, there is provided a computer program product for identifying data relationships from a spreadsheet comprising a plurality of formulae, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to another aspect, there is provided a system for identifying data relationships from a spreadsheet comprising a plurality of formulae. The system comprises a formula analysis component configured to group semantically equivalent formulae of the spreadsheet to define a first group of semantically equivalent formulae. The system also comprise a transformation unit configured to transform each formula of the first group by replacing the variables in each formula with descriptive labels.

Thus, there may be proposed concepts for identifying data relationships from a spreadsheet comprising a plurality of formulae. For instance, such concepts may provide a way of transforming spreadsheet formulae by replacing the variables in each formula with descriptive labels for facilitating detailed data analysis.

BRIEF DESCRIPTION OF THE DRAWINGS

Preferred embodiments of the present invention will now be described, by way of example only, with reference to the following drawings, in which:

FIGS. 5A to 5C depict a method for such dimension extraction according to an embodiment;

DETAILED DESCRIPTION

Figure 1:
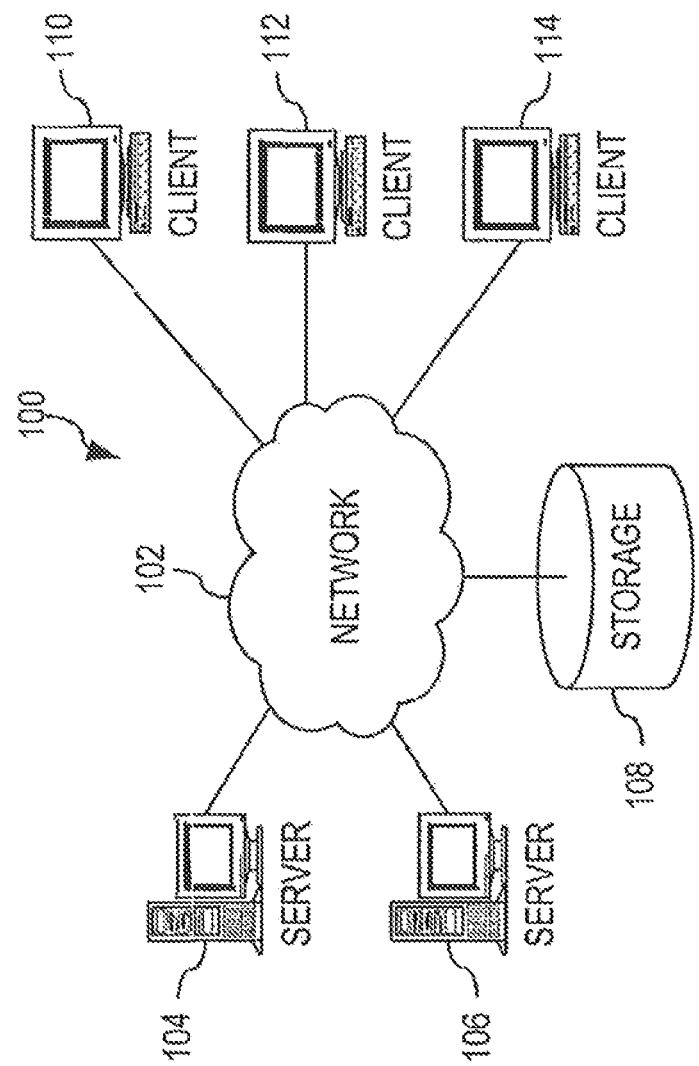
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

Reference to a spreadsheet should be taken to refer to an electronic or digital spreadsheet as would be understood according to its normal meaning by a skilled person. For instance, a spreadsheet will be understood to be an electronic or digital data file that comprises a semi-structured cell-based data representation within which data is provided in cells (arranged in rows and columns) that is used or made available by a computing device.

Also, reference to an Online Analytical Processing (OLAP) model should be taken to a structured representation of data which is configured to facilitate detailed data analysis. OLAP models are built from cubes. Each cube contains several dimensions. The elements in a dimension may contain hierarchical relationships to each other. Data items within the cube may be related to each other by calculations.

Further, reference to a dimension should be taken to refer to an OLAP dimension, which is a component of an OLAP cube. A geometric cube contains three dimensions x, y and z. To refer to a location in the cube you give a co-ordinate for each dimension, for example (2, 3, 7). By analogy, an OLAP cube is made up of OLAP dimensions. Each dimension is a collection of members each of a similar type, for example months is frequently a dimension, as are products or geographic location. Thus, to refer to a given cell in an OLAP cube, one would use a member of each of its dimensions. For example, where a cube contains the dimensions: months, product, location, an example of a cell location would be (January 2019, Loaf of Bread, South East). Further, OLAP dimensions may have hierarchies. For example, the months in 2019 may be children of the dimension 2019.

A cell of a spreadsheet can contain text or numeric data linked by formula, in which the result displayed in one cell is calculated from data entered in other cells. For example, a simple spreadsheet may include the following cells:

|   | A | B | C |
|---|---|---|---|
| 1 | Category | Amount | % |
| 2 | Shoes | 315.45 | 70.45% |
| 3 | Hats | 132.32 | 29.55% |
| 4 | Total | 446.77 | 5 |

There are 3 formula in the simple example above:

Cell B4 (the total) is calculated as =SUM(B2:B3);

Cell C2 (percentage spent on shoes)=B2/B4*100 (it is noted that the *100 is added as part of the percentage formatting); and Cell C3 (percentage spent on hats)=B3/B4*100 (as above)

In the example sheet above, two concepts are expressed as formulae: total and percentage. To build the sheet, these concepts were converted into calculations for individual cells (three calculations in this case). However, nowhere in the spreadsheet are the concepts recorded, only the calculations for each cell.

A data relationship is a relationship between values, for example:

Total Cost=Cost per Unit*Number of Units.

A typical spreadsheet may contain 1000s of formula, usually far more complex than the ones described in the example provided above. Mistakes are common and it is easy to lose track of what is being calculated.

The process of creating a spreadsheet is to express data relationships in multiple individual formula. However, significant value can be obtained from analyzing the formulae and calculating the data relationship(s) being expressed.

Proposed are concepts for identifying data relationships from a spreadsheet comprising a plurality of formulae. Using such concepts, embodiments may facilitate improved spreadsheet analysis that would not otherwise be possible with the existing spreadsheet analysis tools. Embodiments may therefore, for example, infer business rules or technical interrelationships from spreadsheet formulae by grouping distinct but semantically equivalent formulae together and then expressing the resultant formulae in terms that have more meaning to the user.

By way of example, a proposed approach may be summarised as comprising the following stages:

(i) Formulae are grouped together so that all the formulae that express the same concept are put into a single group; and (ii) The group is then translated so that the variables in the resultant formula are replaced by more meaningful terms.

In this way, embodiments may represent formulae of a spreadsheet using descriptive labels that are more understandable to a human user.

By way of initial illustration, let us now consider the following example wherein a simple multiplication A=B*C occurs many times in a spreadsheet. This may represent several different commercial rules: Total Cost=Cost per Unit*Number of Units; Overhead=Overhead proportion*Total Cost; and Depreciation=Depreciation per month*months.

To identify the commercial rules effectively, the concepts that they represent must be determined. This can be done by organising the spreadsheet into a model. To convert a spreadsheet into such a model, various aspects of the sheet may be used, such as data, formatting, layout and formulae.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
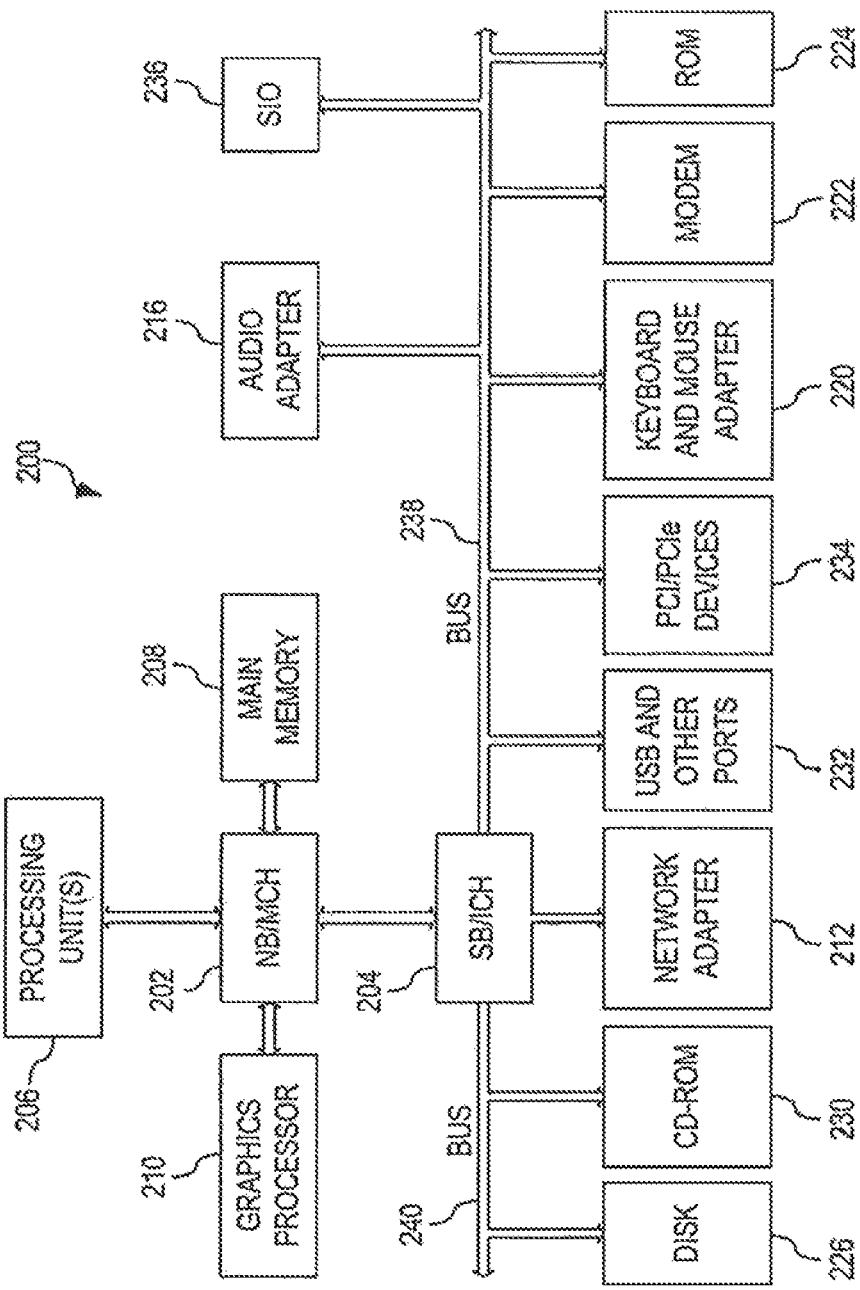
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200. Java and all Java-based trademarks and logos are trademarks or registered trademarks of Oracle and/or its affiliates.

As a server, system 200 may be, for example, an IBM® eServer™ System p5® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer, AIX, and System p5 are trademarks of International Business Machines Corporation, registered in many jurisdictions worldwide. Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments may provide a method and system for identifying data relationships from a spreadsheet automatically, without requiring human intervention.

Figure 3:
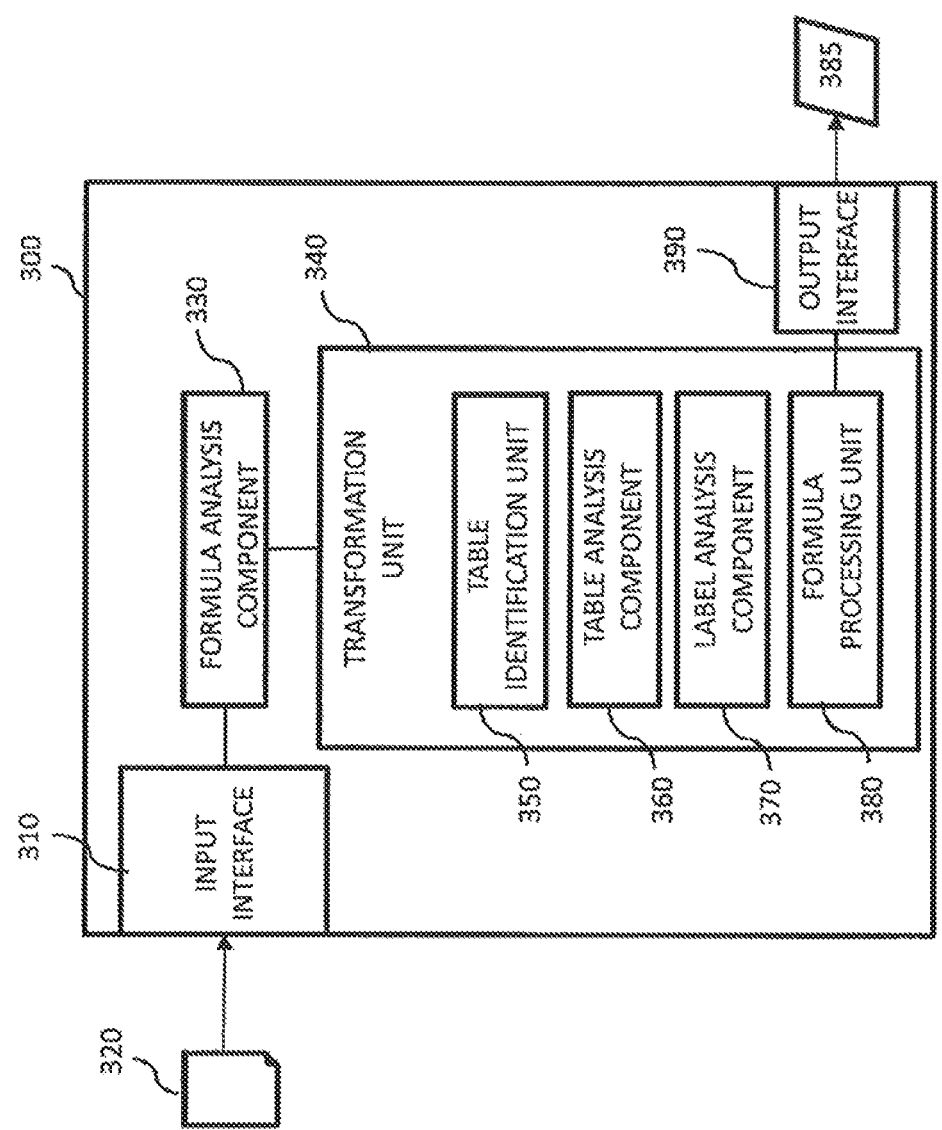
FIG. 3 is a simplified block diagram of proposed system according to an embodiment.

Referring to FIG. 3, there is depicted a schematic diagram of a proposed system according to an embodiment. The system 300 is configured to generate an OLAP model from a spreadsheet.

The system 300 comprises an input interface 310 that is adapted to receive a spreadsheet 320 for analysis. By way of example, the input interface 310 may receive the spreadsheet 320 via a communication link (e.g. via the Internet) or from another component of a local system. In this example, the input interface is configured to read the spreadsheet (e.g. using conventional software such as Apache POI) and provide it to a formula analysis component unit 330 of the system 300.

The formula analysis component 330 is configured to group semantically equivalent formulae of the spreadsheet to define a first group of semantically equivalent formulae. For example, formulae are parsed into Abstract Syntax Trees where lookup functions are replaced with the cell references that they point to, and operator precedence is explicitly encoded with additional brackets. Cell references are converted from all absolute/direct references (A1 style) to relative/indirect references (R1C1 style—a widely known notation).

For example, the following table demonstrates transformation of two cell formulae and shows how they would be grouped together as a result of their equivalence in R1C1 style.

| Formula | R1C1 Absolute Formula/Encoded Pattern |
|---|---|
| C4*VLOOKUP($A5,Assumptions!$B$4:$N$6,C$2) | (R[−1]C[0]*'Assumptions'!R[−1]C[0]) |
| D4*VLOOKUP($A5,Assumptions!$B$4:$N$6,D$2) | (R[−1]C[0]*'Assumptions'!R[−1]C[0]) |

A transformation unit 340 of the system 300 is then configured to transform each formula of the first group by replacing the variables in each formula with descriptive labels. For this purpose, the transformation unit 340 comprises: a table identification unit 350; a table analysis component 360; a label analysis component 370; and a formula processing unit 380.

The table identification unit 350 is configured to identify one or more tables comprising numerical data from the spreadsheet. More specifically, the table identification unit 350 is configured to identify tabular structures within the spreadsheet, and then to classify each the identified tabular structures as one of a column-based table and a crosstab type.

The table analysis component 360 is configured to determine labels from the extracted one or more tables. By way of example, the table analysis component 360 may employ a natural language processing algorithm to determine labels from various locations in the identified tabular structures, and this may be dependent on the classification of the table being processed.

The label analysis component 370 is then configured to group the determined labels into OLAP dimensions. More specifically, the label analysis component 370 is configured to, for each of the one or more tables, identify relationships between columns or rows of the table, and merge columns or rows of the table based on the identified relationships.

Finally, the formula processing unit 380 is configured to replace cell references of each formula with corresponding members of the OLAP dimensions. In particular, the formula processing unit is configured to: identify a cell reference in a formula; and replace the identified cell reference with an OLAP dimension of the corresponding table. Also, the formula processing unit may remove an OLAP dimension of a formula if the formula is present in all member assignments of the OLAP dimension.

Information 385 regarding the transformed formulae is then output from the system 300 via an output interface 390.

From the above description, it will be appreciated that the proposed embodiment provides an automated system for identifying data relationships from a spreadsheet.

By way of further illustration of the proposed concept(s), an exemplary method will now be described with reference to FIGS. 4 to 9. The exemplary method may be broken down into three main stages: (i) Extract tables in the spreadsheets where numerical data are found; (ii) Extract labels from tables and group them into OLAP dimensions; and (iii) Replace cell references with corresponding dimension members and simplify the formula.

(i) Extracting Tables

Figure 4A:
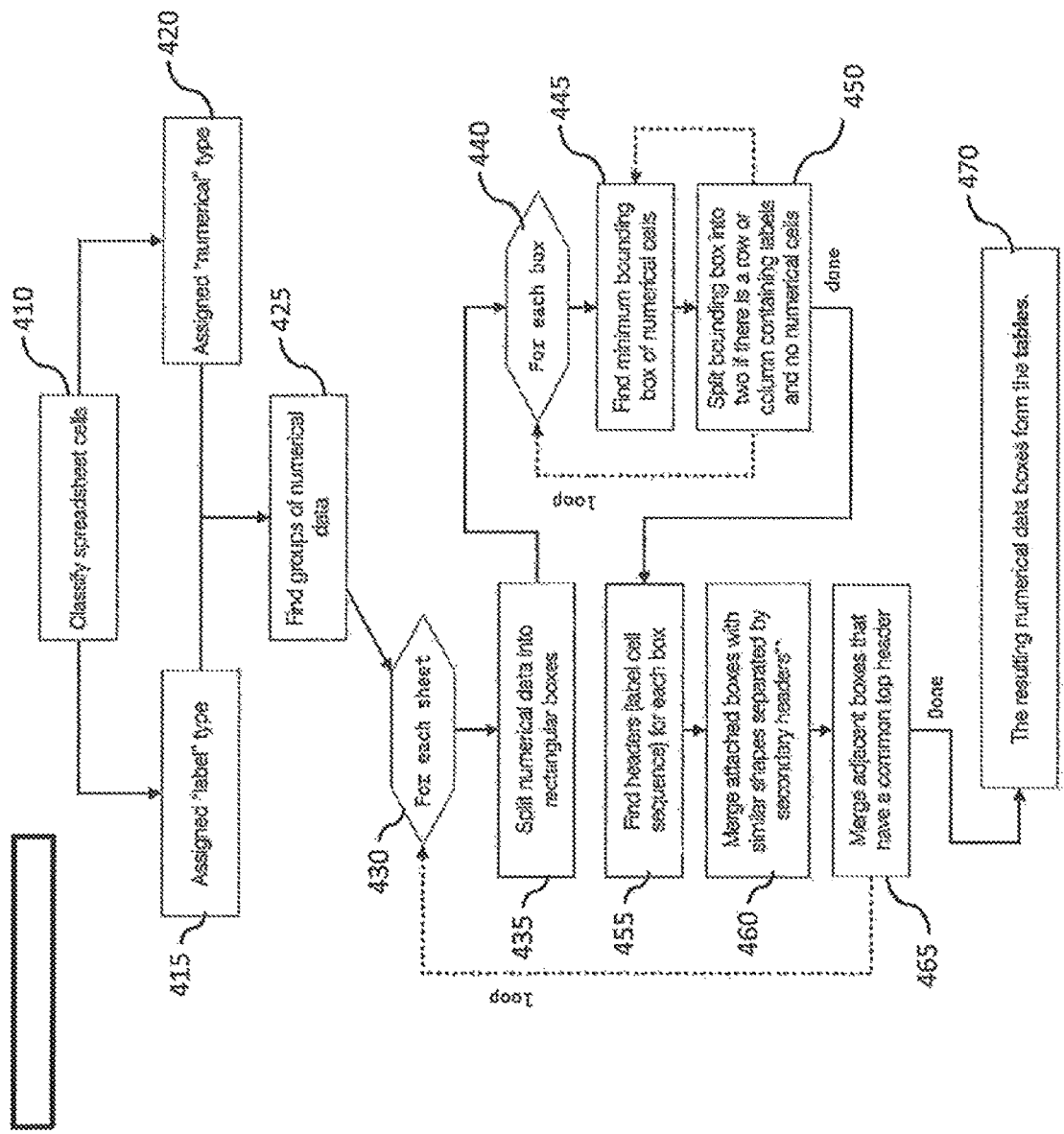
FIGS. 4A and 4B depict a flow diagram of method for identifying tables in a spreadsheet according to an embodiment.
Figure 4B:
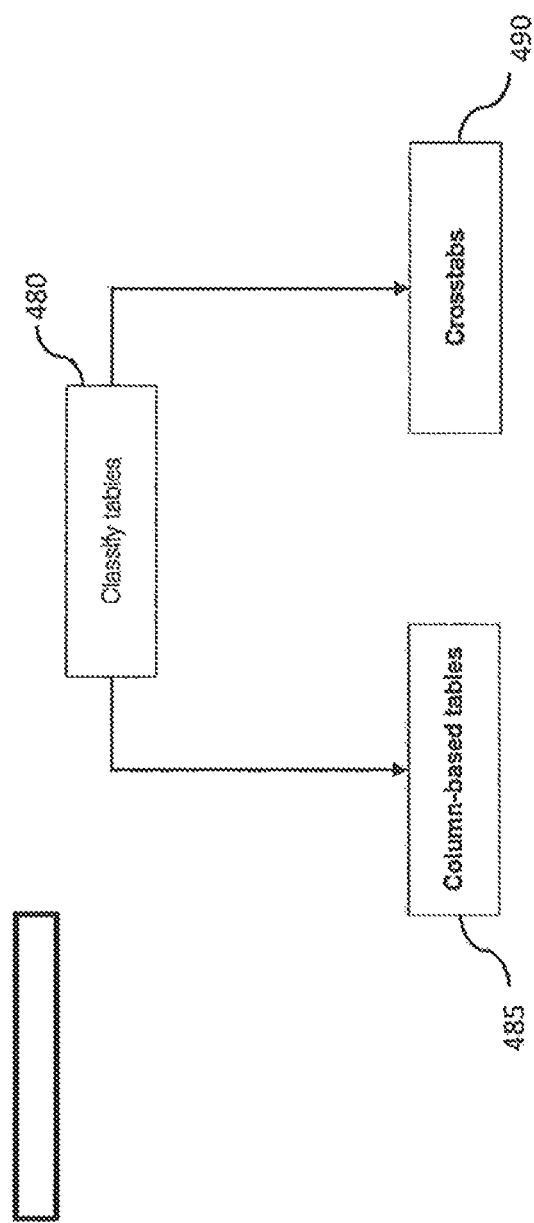

For the purpose of describing an exemplary process of extracting tables, FIGS. 4A and 4B depict a flow diagram of method for extracting tables of a spreadsheet according to an embodiment. More specifically, FIG. 4A shows a flow diagram of a method for table identification, and FIG. 4B shows a flow diagram of a method for table classification.

Referring to FIG. 4A, the method begins in step 410 with classifying the spreadsheet cells into two types: labels (i.e. categorical data) and numerical.

Cells containing text or dates are assigned the label type in step 415 and cells containing integers or floats are assigned the numerical type in step 420. Here, it is noted that ordered sequences of integers (e.g. 1, 2, 3) not surrounded by other numerical cells are assigned the label type.

The loop procedure begins with the step 430 of identifying all sheets that have yet to be processed by the procedures. If a sheet remains, the method proceeds to step 435 which splits numerical data into rectangular boxes. By way of illustration of such boxes, let us now consider an example a simple spreadsheet with the following cells:

|   | A | B | C | ... | M |
|---|---|---|---|---|---|
| 1 |   | January | February | ... | December |
| 2 | Volume | 173 | 167 | ... | 182 |
| 3 | Price | 10 | 10 | ... | 12 |
| 4 | Revenue | =B2*B3 | =C2*C3 | ... | =M2*M3 |

In the above example, the table bounding box extends from cell A1 (at its upper left corner) to cell M4 (at its lower right corner). This bounding box may be denoted by: A1-M4, and it will be appreciated that this bounding box may be split into two boxes (either in column direction or row direction), and the resulting two boxes may each be split, and so on.

For this, the steps of 440 through 450 are repeated for each box. Step 440 checks if a box remains and, if a box remains, the minimum bounding box of numerical cells is found in step 445 and the bounding box is then split (in step 450) into two boxes if there is a row or column containing labels and no numerical cells. Steps 445 and 450 are repeated for each new box until all boxes cannot be split any further.

After splitting numerical data into rectangular boxes, the method proceeds to step 455. In step 455, the headers (sequences of label cells) are found on top and left of each numerical data box. Next, in step 460, attached boxes are merged with similar shapes separated by headers without enough unique labels to function as proper headers. Finally, adjacent (i.e. side-by-side) boxes that have a common top header are merged in step 465. Step 465 also comprises checking if any sheets remain to be processed. If a sheet remains, the method loops back to step 430 in order for the process to be repeated.

If no sheet remains, (i.e. once the loop procedure has completed processing all sheets), the method proceeds to step 470, wherein the resulting numerical data boxes with their associated headers form the tables.

Referring to FIG. 4B, there is depicted a method for classifying tables identified by the method of FIG. 4A. Here, the tables are classified in step 480 into two types based on the arrangement of their headers and data: (485) Column-based tables (similar to relational database tables): these have a top header and interleaving columns of categorical and numerical data. They also have no empty rows or columns (i.e. cannot be disconnected); and (490) Crosstabs: these have a top and left header encapsulating numerical data. Also, any tables not identified as column-based are assigned the crosstab type even if they do not form complete crosstabs.

(ii) Grouping Labels into OLAP Dimensions

After having identified tables, content and structure of OLAP dimensions is identified based on the identified tables. By way of example, FIGS. 5A to 5C depict a method for such dimension extraction according to an embodiment.

Figure 5A:
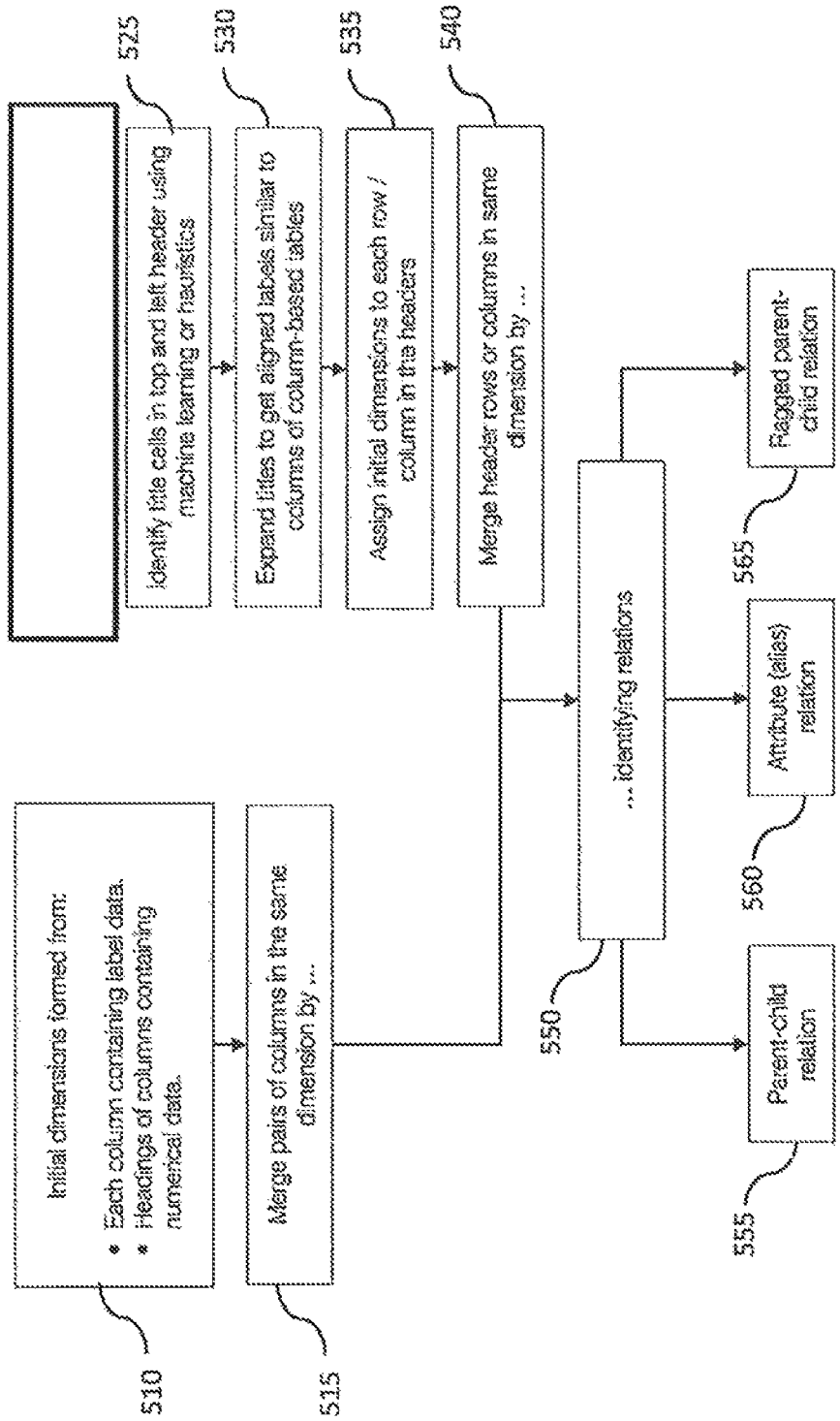

Referring to FIG. 5A, there is depicted a flow diagram of a method for identifying dimensions based on the classification of a table.

Steps 510 and 515 are undertaken for extracting dimensions from column-based tables. Firstly, in step 520, initial dimensions are formed from each column containing categorical data and the headings of columns containing numerical data. Then, step 515 comprises merging pairs of columns into the same dimension.

Here, it is noted that, if multiple pairs of columns share the same relation type but cannot be merged all together, merging is prioritized based on minimum distance.

Conversely, steps 525-540 are undertaken for extracting dimensions from crosstabs. Firstly, in step 525, title cells are identified within the top and left header using machine learning or heuristics.

An exemplary machine learning approach for step 525 comprises: Given a dataset of spreadsheets where a human has identified which cells are titles. For each cell and the cells around it (left, top, right, bottom): features are extracted for each cell where the features can, for example, comprise: words in the cell; and formatting and styles of the cell. It is noted here that a machine learning classifier (e.g. decision tree, neural network) may be trained on the human annotations to predict if a cell contains a title given the extracted features of itself and the features of its context cells.

An exemplary heuristic approach for step 525 comprises: Cells that have additional formatting or styles (e.g. bold, underline, italics, font colour, background colour, etc.) contain titles. If a column is separated into sections with empty lines and the cells on the top of each section do not have any numeric cells on their right, then those cells contain titles. If there are two adjacent columns separated into the same sections by empty lines and the column on the left has non-blank cells only next to the top cell of the right column, then cells on the left column are titles.

Then, in step 530, the titles are expanded to obtain aligned labels similar to columns of column-based tables. Step 535 then comprises assigning initial dimensions to each row or column in the headers. Finally, step 540 comprises merging header rows or columns in the same dimension.

For both types, the merging is undertaken by identifying their relations in step 550. Specifically, in the example of FIG. 5A: (555) for one-to-many relation between values, columns share a parent-child relation; (560) for one-to-one relation between values, columns share an attribute/alias relation; and (565) for one-to-many relation ignoring blank cells, columns share a ragged parent-child relation.

Referring to FIG. 5B, there is depicted a flow diagram of a method for identifying dimensions not found in table columns or headings.

Step 575 checks for all tables that share the same set of dimensions. For all such tables, steps 580 and 585 are undertaken. Step 580 comprises identifying titles that are not part of the table heading (e.g. cells around the top left corner and sheet names). Step 585 then comprises creating dimensions from the identified titles if all titles are unique.

Finally, as depicted in FIG. 5C, all dimensions are extracted by firstly forming a hierarchy of members for each dimension given identified pairwise relations (e.g. by depth-first search) (step 590), and then assigning unique names to dimensions (step 590).

(iii) Formula Transformation

Figure 6:
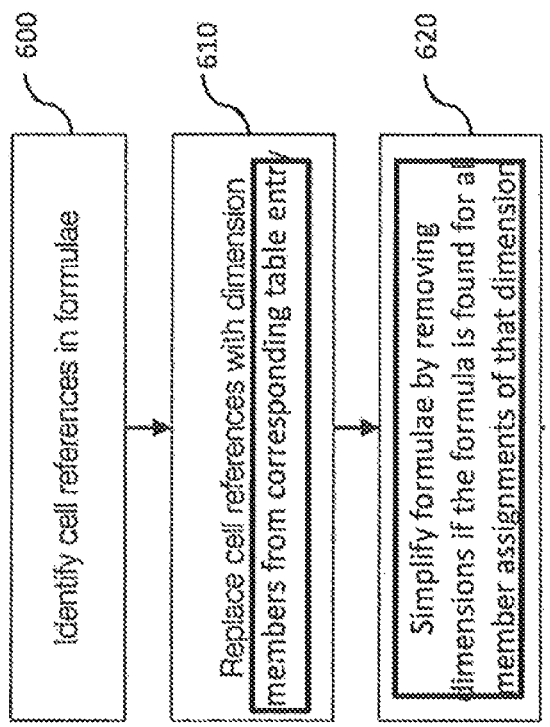
FIG. 6 depicts a flow diagram of a method for transforming formulae according to an embodiment.

By way of example, FIG. 6 depicts a flow diagram of a method for transforming formulae of the spreadsheet according to an embodiment.

The method for transforming formula begins with step 600 of identifying cell references in formulas (i.e. lookup functions resolved to a single cell reference). Next, in step 610, the identified cell references are replaced with dimension members from the corresponding table entry (e.g. for column tables, dimension members on same row and top header; and for crosstabs, dimension members on left and top header). Formulae are then simplified in step 620 by removing dimensions if the formula is found for all member assignments of that dimension.

It will be appreciated that the exemplary embodiment of FIGS. 4 through 6 generates simplified formulae that are more descriptive in natural language, thus facilitating improved understanding and easier inference of interrelationships.

By way of further illustration, let us now consider an example a simple spreadsheet with the following cells:

|   | A | B | C | ... | M |
|---|---|---|---|---|---|
| 1 |   | January | February | ... | December |
| 2 | Volume | 173 | 167 | ... | 182 |
| 3 | Price | 10 | 10 | ... | 12 |
| 4 | Revenue | =B2*B3 | =C2*C3 | ... | =M2*M3 |

According to a proposed embodiment, the following information is generated:

Table bounding box: A1-M4
Table type: Crosstab
Dimensions: ('January', 'December'), ('Volume', 'Price', 'Revenue')
R1C1 formulas: '=R[−2]*R[−3]' (in cells B4-M4)
Label transformed formulas: ('January', 'Revenue')= ('January', 'Volume')*('January', 'Unit Price')
...
('December', 'Revenue')=('December', 'Volume')*('December', 'Unit Price')
Simplified formula: 'Revenue'='Volume'*'Unit Price'

Accordingly, it can be seen how the proposed embodiment automatically simplifies the formulae in the spreadsheet to a format that is more easily understandable to a user.

Thus, rather than a user having to repeatedly cross-reference various cells use in the formulae, proposed embodiments infer relationships and replaces the variables of the formulae with descriptive labels extracted from the spreadsheet. These data relationships (e.g. business rules or feature connections) may therefore be represented in manner which is easier to understand and/or analyze, and such representations may be automatically inferred and defined based on content of the spreadsheet.

Figure 7:
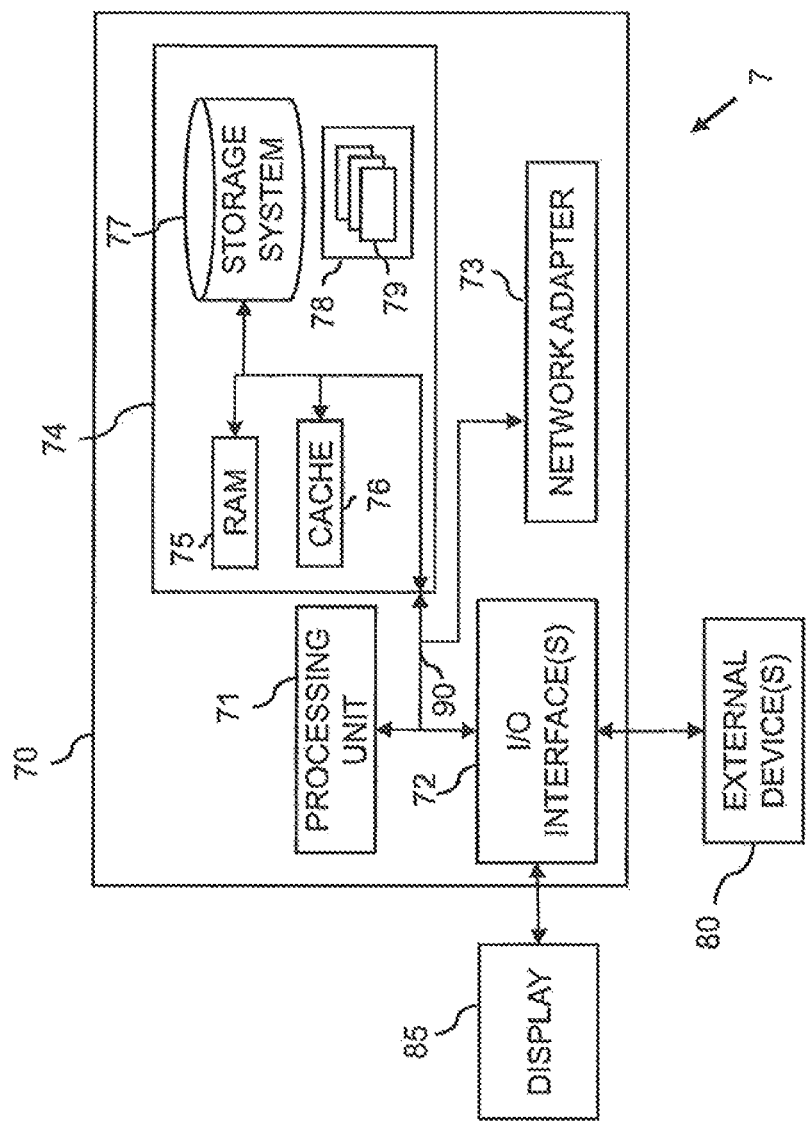
FIG. 7 illustrates a system according to another embodiment.

By way of yet further example, embodiments may comprise a computer system 70, which may form part of a networked system 7 illustrated in FIG. 7. For instance, a transformation unit configured to transform each formula of the first group by replacing the variables in each formula with descriptive labels may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for identifying data relationships from a spreadsheet according to a proposed embodiment. Program/utility 78, having a set (at least one) of program modules 79, may be stored in memory 74. Program modules 79 generally carry out the functions and/or methodologies of proposed embodiments for identifying data relationships from a spreadsheet.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate with a service mesh).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying data relationships from a spreadsheet comprising a plurality of formulae, the method comprising:
    grouping semantically equivalent formulae of the spreadsheet to define a first group of semantically equivalent formulae, each of the formulae in the first group expressing a same concept; and
    transforming each formula of the first group by replacing variables in each formula with descriptive labels by:
    identifying one or more tables comprising numerical data from the spreadsheet by identifying tabular structures in the spreadsheet;
    determining labels from extracted one or more tables, the labels determined using a natural language processing algorithm to determine labels from identified tabular structures in the spreadsheet;
    grouping the determined labels into OLAP dimensions by identifying relationships between columns or rows of the table based upon a minimum distance, and merging columns or rows of the table based on the identified relationships; and
    replacing cell references of each formula with corresponding members of the OLAP dimensions.

2. The method of claim 1, wherein identifying tabular structures within the spreadsheet further comprises:
    classifying each the identified tabular structures as one of a column-based table and a crosstab type.

3. The method of claim 1, wherein replacing cell references of each formula further comprises:
    identifying a cell reference in a formula; and
    replacing the identified cell reference with an OLAP dimension of the corresponding table.

4. The method of claim 3, wherein replacing cell references of each formula further comprises:
    removing an OLAP dimension of a formula if the formula is present in all member assignments of the OLAP dimension.

5. A system for identifying data relationships from a spreadsheet comprising a plurality of formulae, the system comprising:
    a formula analysis component configured to group semantically equivalent formulae of the spreadsheet to define a first group of semantically equivalent formulae, each of the formula in the first group expressing a same concept; and
    a transformation unit configured to transform each formula of the first group by replacing variables in each formula with descriptive labels, the transformation unit comprising:
    a table identification unit configured to identify one or more tables comprising numerical data from the spreadsheet by identifying tabular structures in the spreadsheet;
    a table analysis component configured to determine labels from the extracted one or more tables, the labels determined using a natural language processing algorithm to determine labels from the identified tabular structures in the spreadsheet;
    a label analysis component configured to group the determined labels into OLAP dimensions; and
    a formula processing unit configured to replace cell references of each formula with corresponding members of the OLAP dimensions, the formula processing unit configured to identify a cell reference in one or more formulae and replace the identified cell reference with an OLAP dimension of the corresponding table.

6. The system of claim 5, wherein the table identification unit is configured to:
    classify each the identified tabular structures as one of a column-based table and a crosstab type.

7. The system of claim 5, wherein the label analysis component is configured to:
    for each of the one or more tables: identify relationships between columns or rows of the table based upon a minimum distance; and merge columns or rows of the table based on the identified relationships.

8. The system of claim 5, wherein the formula processing unit is configured to:
    remove an OLAP dimension of a formula if the formula is present in all member assignments of the OLAP dimension.

* * * * *